Patented Oct. 8, 1940

2,216,856

UNITED STATES PATENT OFFICE 2,216,856

PROCESS OF STABILIZING HYDROCARBON OIL WHICH HAS BEEN SWEETENED WITH A REAGENT CONTAINING COPPER

Graham H. Short, Bartlesville, Okla., assignor to Phillips Petroleum Company, a corporation of Delaware No Drawing. Application May 13, 1938,
Serial No. 207,825

7 Claims. (Cl. 196—30)

This invention relates to a novel method of treating hydrocarbon oils to impart stability and prevent deterioration. More specifically, this invention has particular application to the stabilization of hydrocarbon oils which have been treated or sweetened by means of reagents containing copper.

Hydrocarbon oils, especially petroleum distillates, kerosene and gasoline usually require treatment for the removal or the conversion of objectionable impurities. A purifying treatment for the elimination of mercaptans often employs metal salts as reagents; of these, copper salts are particularly effective. However, after treatment with copper salt reagents, many hydrocarbon oils retain small quantities of copper as dissolved or entrained salts, and this dissolved or entrained copper acting as an efficient oxidation catalyst increases the rate of oxidation and condensation of components of the oils with the subsequent deterioration evidenced by the formation of gum, resinous compounds, polymers and color bodies.

One object of this invention is the treatment of hydrocarbon oils which retain traces of copper after sweetening with copper containing reagents to remove said copper from the oil, thereby delaying or preventing deterioration mentioned above.

Another object is to produce by means of this treatment oils which are stable with regard to color and gum content subsequent to copper sweetening.

A third object of this invention is to provide as an integral step in the purification of hydrocarbon oils with copper reagents a stabilizing treatment to prevent the discoloring of said oil and the formation therein of gum, resinous compounds and polymers.

A further object in this respect is to provide a stabilizing treatment utilizing a compound operative in neutral or slightly acid media in order that said stabilization be carried out without further removal from the hydrocarbon oil of naturally occurring gum and color inhibitors by strongly alkaline reagents.

I have now discovered that distillates such as kerosene and gasoline sweetened by reagents containing copper can be freed of copper and thus stabilized by treatment with an aqueous solution containing ferrocyanide ions.

Any soluble ferrocyanide compound is suitable for use in my process. By "soluble" ferrocyanide compound is meant any ferrocyanide compound which by reason of its greater solubility in water is capable of reacting with copper to form the insoluble copper ferrocyanide. Any water-soluble ferrocyanide compound may be employed, whether in aqueous solution or as a solid. Of course, when used in the solid form some moisture must be present, but in general, most petroleum oils contain enough moisture to provide the active ferrocyanide ion. Especially useful and economical are the alkali and alkaline earth ferrocyanides. Specific examples of ferrocyanides which I have found to be particularly advantageous are the ferrocyanide compounds of ammonium, sodium, potassium, calcium, strontium, magnesium and aluminum. Sodium ferrocyanide is of particular importance because of its activity and low cost.

The ferrocyanide reagent may be prepared in a number of ways. An aqueous solution of the soluble ferrocyanide compound may be prepared in which instance the copper-treated petroleum oil is intimately contacted with the treating solution as by mixing in a centrifugal pump or by other known means. The concentration of the ferrocyanide may be varied over a wide range, the lower limit of rapid reaction being in the neighborhood of 0.5 per cent. The upper limit is obviously dependent on the solubility of the particular salt being used, as much as twenty per cent producing highly satisfactory results, although between five and ten per cent is generally more suitable. No appreciable loss is encountered by oxidation of ferrocyanide to ferricyanide, since a mixture of these forms is almost as effective as the ferrocyanide alone.

It has been found that the stabilizing reaction is more rapid in slightly acid solutions, best results being obtained with a pH value within the range of about 1 to 5, although some effectiveness is noticed in reagent solutions with a pH value up to about 9. The choice of acid to be added to produce the desired pH value is not limited. If desired, to buffer the solution, a salt of the acid selected may be added, with the additional advantage of increasing the specific gravity of the aqueous solution.

Another method of obtaining intimate contact between the reagent and copper-treated oil is by the use of a carrier such as clay or coke impregnated with a solution of the reagent. The copper-treated oil is then percolated through a bed of the impregnated carrier. Impregnation of the carrier may be accomplished by spraying the carrier with an aqueous solution of the ferrocyanide compound used and then removing excess water, if present, to obtain the desired concentration.

Still another method which may be desirable in some instances is to percolate the copper-treated oil through a bed comprising alternate layers of a solid, soluble ferrocyanide compound in a divided state and an inert filler such as coke or clay. Enough moisture usually is present in the oil to be stabilized to effect the reaction.

Similar results were obtained with numerous samples of widely differing gasolines and distillates. In the table are tabulated the results of some of these tests. The stabilizing solutions used in these tests were about 5 per cent sodium ferrocyanide and the pH of the solutions varied from about seven to about one.

Table

| Gasoline | Copper test | Original color | Color after 10 days storage | Appearance after 30 days storage |
|---|---|---|---|---|
| West Texas cracked gasoline—copper sweetened and unstabilized | Positive | +22 | 0 | Dark brown—solid precipitate. |
| West Texas cracked gasoline—copper sweetened and stabilized with ferrocyanide. | Negative | +22 | +20 | +19 color—clear. |
| Vapor recovery and polymer gasoline copper sweetened and unstabilized. | Positive | +28 | +15 | 0 color. |
| Vapor recovery and polymer gasoline copper sweetened and stabilized with ferrocyanide. | Negative | +28 | +28 | +28 color. |
| West Texas straight run gasoline—copper sweetened and blended with 50% cracked gasoline—unstabilized. | Positive | +25 | 0 | Dark brown color. |
| West Texas straight run gasoline—copper sweetened and blended with 50% cracked gasoline—stabilized with ferrocyanide. | Negative | +25 | +23 | +22 color. |

The temperature at the time of contacting the oil with the ferrocyanide reagent may be prevailing atmospheric temperatures, little change in the activity of the reagent being noted with raising or lowering the temperature as much as twenty degrees above or below 20° C. The reagent itself may be used to treat many times its volume of oil, since the amount of copper to be removed from the oil is of an extremely small order.

This process of stabilization is applicable as an integral part of a sweetening process using a copper salt reagent, since the sweetened gasoline may be taken directly from the copper reagent and contacted immediately with the ferrocyanide reagent.

The ferrocyanide reagent for stabilizing oils has the advantage of being operative in solutions with a pH below about 9. The avoidance of a stabilizing solution containing strong caustic is beneficial in that gum and color inhibitors occurring naturally in the hydrocarbon oils are usually of acidic character and are subject to removal by treatment with strongly alkaline reagents.

The various methods by which such treatment may be effected will be obvious to those skilled in the art to which this invention pertains, and only a few examples will be stated here to illustrate the process.

A sample of cracked gasoline which had been sweetened by contact with cupric chloride solution and which contained dissolved copper salts was divided into two parts. One part was stored without further treatment. The other portion was intimately contacted with a water solution containing one per cent by weight of sodium ferrocyanide with sufficient acid added to give a pH of about 4. After separation from the ferrocyanide solution, a filtered portion of the stabilized, copper-free gasoline was stored. Comparison of the two samples of gasoline after several days showed that the sample stabilized with ferrocyanide solution was clear and of good color, while the unstabilized sample was dark brown in color and showed a deposit of gummy solid in the bottle.

I claim:
1. The process of stabilizing hydrocarbon oil which has been sweetened with a reagent containing copper against deterioration due to retained copper salts which comprises intimately contacting said oil with an aqueous solution containing ferrocyanide ions in sufficient concentration to stabilize said oil.
2. The process of stabilizing hydrocarbon oil which has been sweetened with a reagent containing copper against deterioration due to retained copper salts which comprises intimately contacting said oil with a ferrocyanide compound with a water-solubility greater than that of copper ferrocyanide.
3. The process of stabilizing hydrocarbon oil which has been sweetened with a reagent containing copper against deterioration due to retained copper salts which comprises intimately contacting said oil with an aqueous solution of a ferrocyanide compound.
4. The method of stabilizing a hydrocarbon oil which has been treated with a copper reagent which comprises intimately contacting the oil with a solution of sodium ferrocyanide acidified to a pH within the range of 1–5.
5. The process of stabilizing hydrocarbon oil which has been sweetened with a reagent containing copper against deterioration due to retained copper salts which comprises intimately contacting said oil with a water-soluble alkali ferrocyanide compound.
6. The method of stabilizing a hydrocarbon which has been treated with a copper reagent which comprises intimately contacting the oil with a soluble alkali ferrocyanide compound acidified to a pH within the range of 1–7.
7. The method of stabilizing hydrocarbon oil treated with copper salt reagents which comprises intimately contacting said oil with an aqueous solution of sodium ferrocyanide of a concentration within the range of about 0.5 to 20 per cent.

GRAHAM H. SHORT.